(12) United States Patent
Rodick

(10) Patent No.: US 6,821,592 B2
(45) Date of Patent: Nov. 23, 2004

(54) CONFORMABLE HOLOGRAPHIC LABELS

(75) Inventor: Ronald G. Rodick, Mentor, OH (US)

(73) Assignee: Avery Dennison Corporation, Pasadena, CA (US)

(*) Notice: Subject to any disclaimer, the term of this patent is extended or adjusted under 35 U.S.C. 154(b) by 0 days.

(21) Appl. No.: 10/210,455

(22) Filed: Jul. 31, 2002

(65) Prior Publication Data
US 2003/0107709 A1 Jun. 12, 2003

Related U.S. Application Data

(60) Provisional application No. 60/309,269, filed on Jul. 31, 2001.

(51) Int. Cl.$^7$ ................................................ B32B 3/00
(52) U.S. Cl. .................. 428/40.1; 283/94; 283/98; 283/109; 428/40.9; 428/41.3; 428/41.5; 428/41.8; 428/42.1; 428/42.2; 428/42.3; 428/192; 428/203; 428/209
(58) Field of Search ............................ 428/40.1, 40.9, 428/41.3, 41.5, 41.7, 42.1, 42.2, 42.3, 192, 203, 209, 41.8; 283/94, 98, 109

(56) References Cited

U.S. PATENT DOCUMENTS

| | | | |
|---|---|---|---|
| 3,113,986 A | 12/1963 | Breslow et al. | 260/683.9 |
| 3,251,905 A | 5/1966 | Zelinski | 260/879 |
| 3,390,207 A | 6/1968 | Moss et al. | 260/879 |
| 3,598,887 A | 8/1971 | Darcy et al. | 260/879 |
| 3,639,521 A | 2/1972 | Hsieh | 260/880 |
| 4,208,356 A | 6/1980 | Fukawa et al. | 525/89 |
| 4,219,627 A | 8/1980 | Halasa et al. | 525/89 |
| 4,226,952 A | 10/1980 | Halasa et al. | 525/192 |
| 4,578,429 A | 3/1986 | Gergen et al. | 525/291 |
| 4,657,970 A | 4/1987 | Shiraki et al. | 525/57 |
| 4,713,273 A | 12/1987 | Freedman | 428/40 |
| 4,728,377 A | 3/1988 | Gallagher | 156/58 |
| 4,795,782 A | 1/1989 | Lutz et al. | 525/66 |
| 4,906,315 A | 3/1990 | McGrew | 156/231 |
| 4,913,858 A | 4/1990 | Miekka et al. | 264/1.3 |
| 4,933,120 A | 6/1990 | D'Amato et al. | 264/13 |
| 5,003,915 A | 4/1991 | D'Amato et al. | 118/46 |
| 5,083,850 A | 1/1992 | Mallik et al. | 359/1 |
| 5,116,548 A | 5/1992 | Mallik et al. | 264/1.3 |
| 5,145,212 A | 9/1992 | Mallik | 283/86 |
| 5,164,227 A | 11/1992 | Miekka et al. | 427/162 |
| 5,164,444 A | 11/1992 | Bernard | 524/833 |
| 5,186,782 A | 2/1993 | Freedman | 156/244.11 |
| 5,242,650 A | 9/1993 | Rackovan et al. | 264/509 |
| 5,358,792 A | 10/1994 | Mehta et al. | 428/516 |
| 5,435,963 A | 7/1995 | Rackovan et al. | 264/509 |
| 5,462,809 A | 10/1995 | Berkowitz | 428/546 |
| 5,464,690 A | 11/1995 | Boswell | 428/334 |
| 5,468,440 A | 11/1995 | McAlpin et al. | 264/291 |
| 5,475,075 A | 12/1995 | Brant et al. | 526/348.3 |
| 5,530,054 A | 6/1996 | Tse et al. | 524/474 |
| 5,639,811 A | 6/1997 | Plamthottam et al. | 524/272 |
| 5,643,678 A | 7/1997 | Boswell | 428/467 |
| 5,670,003 A | 9/1997 | Boswell | 156/220 |
| 5,674,580 A | 10/1997 | Boswell | 428/40.9 |

(List continued on next page.)

OTHER PUBLICATIONS

PCT/US02/24368; PCT International Search Report mailed Dec. 12, 2002.

*Primary Examiner*—Nasser Ahmad
(74) *Attorney, Agent, or Firm*—Renner, Otto, Boisselle & Sklar, LLP

(57) ABSTRACT

This invention relates to a facestock comprising a polymeric film, and a holographic layer on a surface of the facestock, wherein the film is conformable. The invention also relates to label stocks prepared from the facestocks, and labels made therefrom. The labels are useful on squeezable containers. An advantage of these labels is that there is little or no cracking or flaking of the holographic image.

5 Claims, 3 Drawing Sheets

U.S. PATENT DOCUMENTS

| | | | |
|---|---|---|---|
| 5,709,937 A | 1/1998 | Adams et al. | 428/332 |
| 5,716,669 A | 2/1998 | LaRose et al. | 427/208.4 |
| 5,753,349 A | 5/1998 | Boswell | 428/195 |
| 5,759,683 A | 6/1998 | Boswell | 428/334 |
| 5,783,017 A | 7/1998 | Boswell | 156/231 |
| 5,810,957 A | 9/1998 | Boswell | 156/220 |
| 5,948,199 A | 9/1999 | McGrew | 156/231 |
| 6,007,665 A | 12/1999 | Bourdelais et al. | 156/277 |
| 6,165,609 A | 12/2000 | Curatolo | 428/343 |
| 6,214,443 B1 | 4/2001 | Palmasi et al. | 428/203 |
| 6,376,058 B1 | 4/2002 | Schut et al. | 428/220 |

CONFORMABLE HOLOGRAPHIC LABELS

This application claims the benefit of Provisional Application No. 60/309,269, filed Jul. 31, 2001.

FIELD OF THE INVENTION

This invention relates to labels and facestocks that are conformable and contain a holographic image. More specifically, this invention relates to a label and facestock that contain a holographic image layer which is conformable and/or squeezable, e.g. the holographic image does not crack or flake.

BACKGROUND OF THE INVENTION

Holograms and other types of defraction gratings are commonly attached to documents or other articles. Holograms have been used as security means in documents as well as credit cards to authenticate their genuineness and increase the difficulty of counterfeiting those articles. Holograms have also been attached to printed documents and other articles for decorative and aesthetic reasons, as well. For consumer goods, hologram containing labels provide an eye-catching display for products.

One problem associated with the use of holograms in labels has been that holograms tend to be stiff. The hologram within the label tends to crack or flake. In labels, holograms may provide market appeal but have traditionally been avoided due to the problem with the image being destroyed during processing or during the use of the product containing the holographic label. It is desirable to have a hologram within a label where the image is conformable to a squeezable bottle or squeezable container.

SUMMARY OF THE INVENTION

This invention relates to a facestock comprising a polymeric film, and a holographic layer on a surface of the facestock, wherein the film is conformable. The invention also relates to label stocks prepared from the facestocks, and labels made therefrom. The labels are useful on squeezable containers. An advantage of these labels is that there is little or no cracking or flaking of the holographic image.

DETAILED DESCRIPTION OF THE PREFERRED EMBODIMENTS

As described herein, the present invention relates to labels and facestocks for use therein. The labels are useful on deformable and squeezable bottles. The deformation may be permanent as in toothpaste tubes or non-permanent, as in hair shampoo bottles, toothpaste tubes, hand lotion bottles and tubes, etc.

As used herein, the term "conformable" means the film or label has the ability to yield to the contours of a curved or rough surface. A conformable holographic label will conform to the container or substrate to which it is applied without cracking or flaking of the holographic image.

Holographic Layer

Figure 1A:
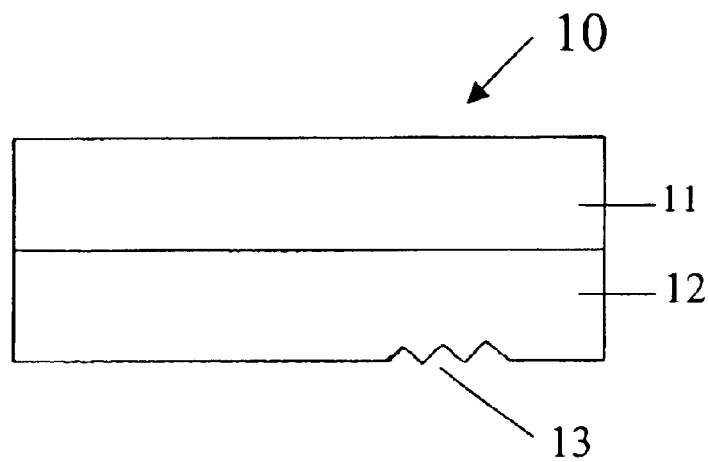
FIG. 1a is a cross-section of a facestock of the present invention comprising a film layer embossed with an image.

The facestock and label stock contain a holographic layer. As shown in FIG. 1a, facestock 10 has a polymeric film layer 11, having an upper surface and a lower surface, wherein the lower surface is adhered to a holographic layer 12. The bottom surface of polymeric film 11 may be adhered directly to the holographic layer 12, or adhered indirectly to the holographic layer through either a tie layer or adhesive layer (not shown). The holographic layer 12 has an image 13 on the surface opposite of the polymeric film layer 11.

Figure 1B:
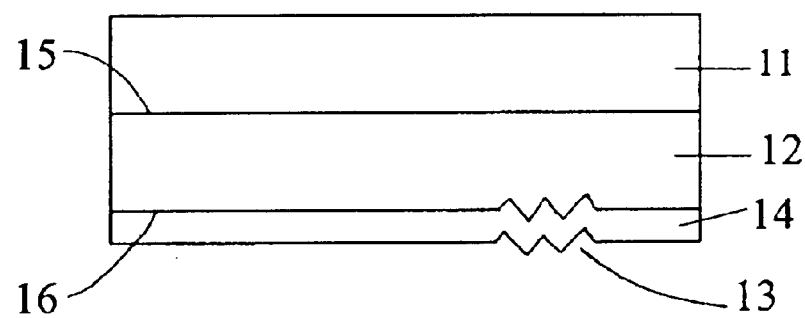
FIG. 1b is a cross section of a facestock of the present invention comprising a film layer and a holographic layer, having a reflective material coating the whole surface of the holographic layer.

In one embodiment, the holographic layer having an upper surface and an image surface, has a reflective material on the image surface. As shown in FIG. 1b, the polymeric film 11 is adhered to the holographic layer 12, having upper surface 15 and image surface 16 having image 13. A reflective material 14, such as aluminum or other material known to those in the art covers the image surface 16 and forms the hologram on the surface of holographic layer 12.

Figure 1C:
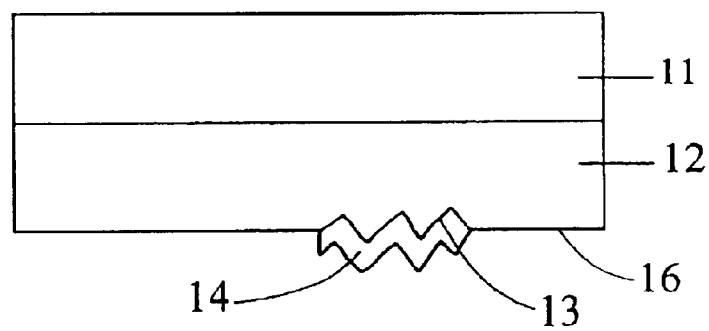
FIG. 1c is a cross section of a facestock of the present invention comprising a film layer and a holographic layer, having a reflective material coating only the image area of the holographic layer.

In another embodiment, as shown in FIG. 1c, the facestock has polymeric layer 11 adhered to holographic layer 12, having image 13. The reflective material 14 covers only a portion of the image surface 16 of holographic layer 12, namely the area of the image 13.

The holographic layer contains an image that is treated with a reflective materials as is known to those in the art. The image may be formed on the polymeric facestock by embossing the film and then metalizing the image area or the entire image surface of the film. The image may also be formed using a liquid casting resin. This resin can be a radiation curable resin that is coated onto the facestock film. The image is imparted to the casting resin using a hologram master or other means known to those in the art. The radiation curable resins include Cellofilms, such as Cellofilm C-200 and Radcure resins, such as Radcure #801.

The radiation curable resins are generally used as an oligomer. The oligomers are available commercially from a variety of sources. Urethane acrylate oligomers are available from Morton Thiokol under the designations Uvithane 782 and Uvithane 783, and from Polymer Systems Corp., Orlando, Fla. under the designation PURELAST. Ebecryl 270 is an acrylated aliphatic urethane oligomer available from UCB Radcure, Atlanta, Ga. Epoxy acrylate oligomers are available, for example, from UCB Radcure, Atlanta, Ga. under the designations Novacure 3600 and from Shell Chemical Company under the designation Epocryl 25A60. Although Epocryl 25A60 contains some volatile solvent, the product can be mixed with an acrylate monomer such as, for example, 1,6-hexanediol diacrylate, and the solvent originally present can be removed. An example of a commercially available acrylic acrylate oligomer is Novacure 6700 from UCB Radcure. An example of a commercially available polyamine acrylate oligomer is Novacure 7100 from UCB Radcure. This acrylate functional oligomeric amine is a liquid having a viscosity in the range of 500 to 1500 CPS at 25° C. and a theoretical molecular weight of 800, and the oligomer contains less than 10% of hexanediol diacrylate.

The process of imparting the image to the holographic layer and materials used therein, including materials used as the casting resin, are described in U.S. Pat. Nos. 4,728,377 (Gallagher); 4,913,858 (Mallik et al); 4,933,120 (D'Amato); 5,003,915 (D'Amato); 5,083,850 (Miekk et al), 5,116,548 (Mallik); 4,906,315 (McGrew); 5,948,199 (McGrew); 5,164,227 (Miekka et al); and 5,643,678 (Boswell), the entire disclosures of which are hereby incorporated by reference herein.

In another embodiment, the hologram image is prepared using a foil/composite sheet. U.S. Pat. Nos. 5,810,957, 5,783,017, 5,759,683, 5,753,349, 5,674,580, 5,670,003, 5,643,678 and 5,464,690 relate to foil/composite sheets having a holographic image or diffraction grating image impressed into the foil and one or more of the composite layers. These patents disclose, e.g., hot stamping a chip containing the holographic image directly on a substrate such as a document. The foil/composite sheet disclosed in 5,810,957, for example, includes in order, a plastic carrier film, a release coating, a hard lacquer coating, a soft lacquer coating, a layer of metal and an embossment receiving coating. The soft lacquer coating, the metal layer and the embossment receiving coating are embossed with the holographic image when a heated embossing shim applied under pressure against the embossment receiving layer. A heat activatable adhesive is thereafter applied to the embossment receiving coating, to apply the chip to the document. The embossment receiving coating, which may also be referred to as a release coating, may be a wax such as a microcrystalline wax or partially saponified montan wax or may be a siloxane. The metal is, e.g., aluminum. The soft lacquer coating may be a thermosoftening polymer which contains an acrylic or nitrocellulose or a chlorinated rubber. The other patents in this group disclose similar foil/composite sheet constructs in which a holographic image is applied to the foil/composite sheet to form a chip, and thereafter the chip is applied to a document or other substrate by, e.g., hot stamping. Each of U.S. Pat. Nos. 5,810,957; 5,783,017; 5,759,683; 5,753,349; 5,674,580; 5,670,003; 5,643,678 and 5,464,690 is incorporated herein by reference for the teachings relating to forming such hot-stampable holographic images on foil/composite sheets.

Polymeric Facestocks

The facestocks comprise a holographic layer and a polymeric film. The film may be a monolayer polymeric film or a multilayer polymeric film. Such multilayer films generally contain a base layer and optionally, one or more additional layers. The layers may be laminated together by coextrusion or may be adhered together using adhesives. In one embodiment, the facestocks of the present invention have improved machine direction Gurley stiffness and die-cuttability, particularly when the polymeric film has been oriented in the machine direction only. When the polymeric film is a multilayer film, the base layer only may be oriented or all layers of the multilayer film may be oriented in the machine direction. A multilayer film of the present invention in which only the base layer has been machine direction oriented can be obtained by preparing a machine direction oriented polypropylene film and thereafter coextrusion coating a tie layer and the first skin layer over the oriented polypropylene layer to form a three layer film. More often, however, the entire film is machine direction oriented after formation, preferably by coextrusion.

In one embodiment, the base layer of a multilayer film and/or the entire multilayer film is oriented in the machine direction at a stretch ratio of at least about 2:1, and/or at a stretch ratio of from about 3:1 to about 9:1. In another embodiment, the single or multilayer film is oriented in a machine direction at a ratio of about 4:1 to about 6:1. The oriented films are then usually heat set or annealed to provide dimensional stability (i.e., to prevent shrinking, relaxing or any distortion of the film).

The thickness of the facestock will range from about 0.5 mils (12.5 microns) to about 10 mils (250 microns) depending upon the anticipated utility of the facestock. More often, however, the facestocks of the present invention will have a thickness of less than 6 mils (150 microns). Facestock thicknesses of from about 1 to about 6 mils (25 to 150 microns), more often from about 1 to about 4 mils (25 to 100 microns) and most often from about 1.5 to about 2.5 mils (37.5 to 62.5 microns) are particularly useful for preparing labels to be applied to rigid and flexible substrates. As noted earlier, a particular feature of the facestocks of the invention is that very thin films (i.e., 1 to 2.5 mils, or 25 to 62.5 microns) can be prepared and are useful in forming labels. Here and elsewhere in the specification and claims the range and ratio limits may be combined.

The film may be formed from any polymer or combination of polymers that are useful in forming polymeric facestocks and labels. The polymeric film may be derived from polymers that include polystyrenes, polyolefins, polyamides, polyesters, polycarbonates, polyvinyl alcohol, poly(ethylene vinyl alcohol), polyurethanes, polyacrylates, poly(vinyl acetates), ionomers and mixtures thereof. In one embodiment, the polymeric film material is a polyolefin. In another embodiment, the polyolefin film materials generally are characterized as having a melt index or melt flow rate of less than 30, more often less than 20, and most often less than 10 as determined by ASTM Test Method 1238. The polymeric films of the invention are conformable.

In one embodiment, the polymeric film is (a) a propylene homopolymer or copolymer, (b) polyethylene or (c) a blend of (i) a propylene homopolymer or polyethylene and (ii) at least one propylene copolymer. When blends of homopolymers and copolymers are used, the blends may comprise from about 5% to about 95% of the homopolymer and correspondingly from about 95% to about 5% by weight of the copolymer. The propylene homopolymers that may be utilized as the base material either alone or in combination with a propylene copolymer as described herein, include a variety of propylene homopolymers such as those having melt flow rates (MFR) from about 1 to about 20 as determined by ASTM Test D1238, condition L. Propylene homopolymers having an MFR of at least about 4, or at least about 8, are particularly useful and provide facestocks having improved die-cuttability. Useful propylene homopolymers also may be characterized as having densities in the range of about 0.88 to about 0.92 g/cm$^3$.

A number of useful propylene homopolymers are available commercially from a variety of sources. Some of the useful homopolymers are listed and described in the following Table I.

TABLE I

Commercial Propylene Homopolymers

| Commercial Designation | Company | Melt Flow g/10 min | Density (g/cm$^3$) |
|---|---|---|---|
| WRD5-1057 | Union Carbide | 12.0 | 0.90 |
| DX5E66 | Union Carbide | 8.8 | 0.90 |
| 5A97 | Union Carbide | 3.9 | 0.90 |
| Z9470 | Fina | 5.0 | 0.89 |
| Z9470HB | Fina | 5.0 | 0.89 |
| Z9550 | Fina | 10.0 | 0.89 |

TABLE I-continued

Commercial Propylene Homopolymers

| Commercial Designation | Company | Melt Flow g/10 min | Density (g/cm³) |
|---|---|---|---|
| 6671XBB | Fina | 11.0 | 0.89 |
| 3576X | Fina | 9.0 | 0.89 |
| 3272 | Fina | 1.8 | 0.89 |
| SF6100 | Montell | 11.0 | 0.90 |

The propylene copolymers that may be utilized in the base layer generally comprise copolymers of propylene and up to about 40% by weight of at least one alpha-olefin selected from ethylene and alpha-olefins containing from 4 to about 8 carbon atoms. Examples of useful alpha-olefins include ethylene, 1-butene, 1-pentene, 4-methyl-1-pentene, 1-hexene, 1-heptene, and 1-octene. More often, the copolymers of propylene that are utilized in the present invention comprise copolymers of propylene with ethylene, 1-butene or 1-octene. The propylene alpha-olefin copolymers useful in the present invention include random as well as block copolymers, although the random copolymers generally are preferred. Blends of the copolymers as well as blends of the copolymers with propylene homopolymers can be utilized as the composition for the base layer. In one preferred embodiment, the propylene copolymers are propylene-ethylene copolymers with ethylenic contents of from about 0.2% to about 10% by weight. In one embodiment, the ethylene content is from about 3% to about 10% by weight and more preferably from about 3% to about 6% by weight. With regard to the propylene-1-butene copolymers, 1-butene contents of up to about 15% by weight are useful. In one embodiment, the 1-butene content generally may range from about 3% by weight up to about 15% by weight, and in other embodiments, the range may be from about 5% to about 15% by weight. Propylene-1-octene copolymers useful in the present invention may contain up to about 40% by weight of 1-octene. More often, the propylene-1-octene copolymers will contain up to about 20% by weight of 1-octene.

In one embodiment, the propylene copolymers used in the present invention are obtained by copolymerization of propylene with an alpha-olefin such as ethylene or 1-butene using single-site metallocene catalysts. A list of some useful commercially available propylene copolymers is found in the following Table II. The propylene copolymers useful in the invention have an MFR of from about 1 to about 20, preferably from about 1 to about 12. Improved die-cuttability is obtained when the propylene copolymer has an MFR of at least about 4.

In one embodiment, the polymeric film is characterized as being clear or crystal clear. The film is a machine direction only oriented film having an opacity of about 10% and a haze of about 10% or less in the machine direction and cross direction. In one embodiment, the haze is about 5% or less. The opacity of the film is measured using TAPPI Test 425, and the haze is measured in accordance with ASTM Test Method D-1003. The percent of ethylene in the propylene-ethylene copolymers and the percent of 1-butene in the propylene-1-butene copolymers, and the draw or stretch ratio in the machine-direction are controlled and may be varied to provide the desired clarity.

In general, as the concentration of ethylene or 1-butene in the propylene copolymers increases, the haze of the film decreases. For example, when the copolymer film comprises a polypropylene-ethylene copolymer that contains from about 5% to about 6% of ethylene, clear films can be obtained at stretch rations in the machine direction of about 7 or less, and more often of about 5 or less. A stretch ratio of about 4 or less is useful when the copolymer is a propylene-ethylene copolymer that contains from about 3% to about 6% of ethylene. In particular, a propylene-ethylene copolymer containing about 5,5% ethylene provides a clear film when oriented in the machine0direction at a stretch ration of about 5:1. When the copolymer film is a propylene-ethylene copolymer containing 3.2% ethylene, a stretch ration of about 4:1 provides a clear film. Clear films also are obtained when a propylene-1-butene copolymer containing about 8% to 14% 1-butene are drawn at a stretch ratio of about 4:1 and 5:1.

In one embodiment, the polymeric film comprises a monolayer of a blend of (a) a propylene homopolymer or copolymer and (b) an alkylene-alkyl-acrylate or methacrylate copolymer. The alkylene can be an a-olefin containing from about 2 to about 8 carbon atoms. The alkyl-acrylate can be a $C_1$–$C_8$ alkyl acrylate or methacrylate. In one embodiment, the alkylene-alkyl-acrylate is ethylene butyl acrylate copolymer. The amount of propylene homopolymer or copolymer in the blend is generally within the range of 40–90% by weight and the amount of alkylene-alkyl-acrylate or methacrylate copolymer in the blend is generally within the range of 10–60% by weight.

TABLE II

Commercial Propylene Copolymers

| Commercial Name | Source | % Ethylene | % 1-Butene | Melt Flow Rate (g/10 mins) | Density (g/cm³) |
|---|---|---|---|---|---|
| DS4D05 | Union Carbide | — | 14 | 6.5 | 0.890 |
| DS6D20 | Union Carbide | 3.2 | — | 1.9 | 0.890 |
| DS6D81 | Union Carbide | 5.5 | — | 5.0 | NA |
| SRD4-127 | Union Carbide | — | 8 | 8.0 | NA |
| SRD4-104 | Union Carbide | — | 11 | 5.0 | NA |
| SRD4-105 | Union Carbide | — | 14 | 5.0 | NA |

In another embodiment of the invention, the film may comprise a polyethylene, such as low density, linear low density, high density, very high density polyethylene as well as ethylene copolymers. In one embodiment, the polyethylene may be oriented in the machine direction. Stretch ratios may range from about 2:1 to about 9:1.

The film may contain other additives to modify the properties of the base layer and the facestock film. For example, colorants may be included in the base layer such as $TiO_2$, $CaCO_3$, etc. The presence of small amounts of $TiO_2$, for example, results in a white facestock. Antiblock agents also can be included in the base layer. AB-5 is an antiblock concentrate available from A. Schulman Inc., 3550 West Market Street, Akron, Ohio 44333, that comprises 5% solid synthetic amorphous silica in 95% low density polyethylene. ABPP05SC is an antiblock concentrate from Schulman containing 5% of the synthetic amorphous silica in a propylene copolymer. The amount of antiblock agent (silica) present in the base layer may range from about 500 to about 5000 ppm, with amounts of about 1000 ppm being preferred. In some embodiments, it also is advantageous to add flexible polyolefins to the base layer to reduce graininess and reduce cross-direction (CD) splitting. Useful flexible polyolefins (polypropylene copolymers) are available from Rexene under the trade designation W-105, W-107, and W-113.

Figure 2:
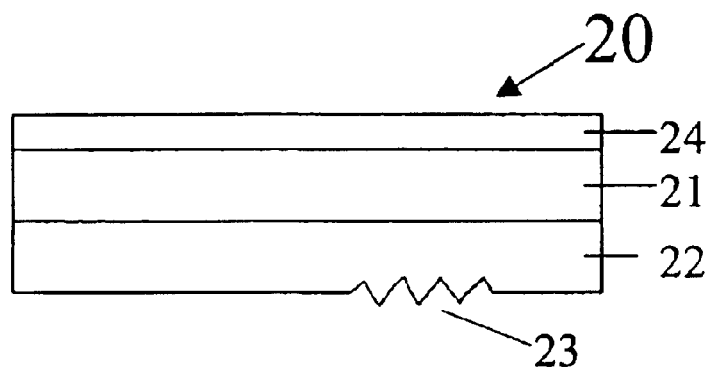
FIG. 2 is a cross-section of a facestock of the present invention comprising a multilayer film having two layers and a holographic layer.

As illustrated in FIG. 2, the film may be a multilayer film. Facestock 20 comprises a base layer 21 having an upper and lower surface. The upper surface of base layer 21 is adhered to a skin layer 24. The base layer 21 may be adhered to the skin layer directly, as is typical for coextruded films, or indirectly, through a tie layer or adhesive layer. The lower surface of the base layer is adhered to the holographic layer 22 having image 23 therein.

The multilayer films of the present invention may further comprise at least one tie layer positioned between the base layer and the first skin layer. The tie layer may comprise any polymeric material that improves the adhesion of the first skin layer to the base layer. In one embodiment, the tie layer comprises a mixture of a propylene homopolymer or copolymer and a soft polar additive ("SPA") such as ethylene vinyl acetate copolymer (EVA). Any of the propylene homopolymers or copolymers described above as useful in the base layer can be used in the tie layer. The weight ratio of the propylene polymer or copolymer and the SPA in the blend may range from about 50/50 to 60/40. The soft polar additives generally comprise random copolymers of an olefin and a more polar moiety. In addition to the preferred soft polar additive, which is ethylene vinyl acetate copolymer (EVA), the tie layers may include other soft polar additives such as ethylene methylacrylate (EMA) and acrylonitrile butadiene rubber.

Particular examples of such blends useful as the tie layer include a blend containing 50% EVA and 50% of a random propylene copolymer containing about 6% ethylene; a blend of 60% EVA and 40% of a propylene homopolymer; and 50% EMA and 50% of a propylene homopolymer. Specific examples of ethylene vinyl acetate copolymers useful in the present invention are those containing 18% vinyl acetate and 28% vinyl acetate.

The tie layers also may comprise polar additives such as ethylene methylacrylate (EMA) without any additional propylene polymer. Examples of a useful commercially available EMA include EM-803-115 (melt index=3.5), EM 806-009 (melt index=6.0) and EM 802-009 (melt index=2.0) available from Equistar, 1221 McKinney, Houston, TX 77252.

Examples of thermoplastic film forming polymers that can be utilized in the skin layer, either alone or in combination with other thermoplastic polymers include polyolefins (linear or branched), polyamides, polystyrenes, nylon, polyesters, polyester copolymers, polyurethanes, polysulfones, polyvinylidine chloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polycarbonates, polyacrylonitriles, and ethylene-vinyl acetate copolymers. Some specific examples of thermoplastics useful as the second skin layer include acrylates such as ethylene methacrylic acid, ethylene methyl acrylate, ethylene acrylic acid and ethylene ethyl acrylate. In one embodiment, the skin layer comprises a mixture of a polyethylene and a propylene homopolymer or copolymer. The selection of a particular polymer for the skin layer is dependent on the properties and characteristics that are to be added by the presence of the skin layer. The polymer for the skin layer should be compatible with the polymer of the base layer to provide sufficient adhesion to the base layer in the absence of a tie layer.

In FIG. 2, the lower surface of base layer 21 is also adhered to holographic layer 22, having holographic image 23. As described above, the adherence may be direct or indirect through the use of the tie layer. For convenience, the reflective layer is not shown in FIG. 2. As previously described, the reflective material may cover only a portion or all of the holographic layer.

In one embodiment, the skin layer that is bonded to the upper surface of the base layer by a tie layer in the multilayer film facestocks of the present invention comprises at least one polyethylene having a density of about 0.940 g/cm³ or less. Such polyethylenes generally are referred to in the art as low density or medium density polyethylenes, and these polyethylene homopolymers can be prepared by techniques well known to those skilled in the art including high pressure, free radical catalyzed processes and processes using metallocene catalysts. Low density polyethylenes and metallocene catalyzed processes for preparing such polyethylenes are described in U.S. Pat. Nos. 5,358,792; 5,462,809; 5,468,440; 5,475,075; and 5,530,054. Each of these patents is hereby incorporated by reference for its disclosure of metallocene catalysts, polyethylenes, and methods for preparing polyethylenes. Metallocene-catalyzed polyethylene generally have a density of from about 0.850 to about 0.925 g/cm³, and more often from about 0.870 to about 0.920 g/cm³.

Useful ethylene homopolymers for the skin layer include those having densities of from 0.850 up to about 0.940 or less. Polyethylenes having densities of from 0.850 to about 0.925 g/cm³ generally are referred to as low density polyethylenes, and polyethylenes having densities between about 0.925 and 0.940 are referred to in the art as being medium density polyethylenes. The low and medium density polyethylenes useful in the skin layer also may be characterized as having a melt index (as determined by ASTM Test D1238, condition E) in the range of from 0.5 to about 25. In addition to the above densities, and melt indices, the low density polyethylenes may be characterized by tensile strengths of between about 2200 to about 3200 psi (typically about 2700 psi), and the medium density polyethylenes may be characterized as having tensile strengths of between about 3000 and about 4000 psi (typically about 3400 psi). The determination of whether a low density or medium density polyethylene is to be utilized as the skin layer is based in part on the film thickness of the skin and the overall thickness of the facestock. Thicker films of lower density polyethylenes generally are preferred because of the softness and relatively low tensile strength of the low density polyethylenes. Conversely, thinner films of medium density polyethylenes can be utilized in the facestocks of the present invention.

Low and medium density polyethylene useful in the skin layer of the facestock of this invention are available commercially from a variety of sources. Examples of useful polyethylenes are summarized in the following Table III.

TABLE III

Commercial Polyethylenes

| Commercial Designation | Company | Melt Index (g/10 mins) | Density (g/cm³) |
|---|---|---|---|
| Rexene 1017 | Rexene | 2.0 | 0.920 |
| Rexene 1058 | Rexene | 5.5 | 0.922 |
| Rexene 1080 | Rexene | 2.0 | 0.930 |
| Rexene 2030 | Rexene | 5.0 | 0.919 |
| Rexene 2034 | Rexene | 7.5 | 0.925 |
| Rexene 2038 | Rexene | 9.0 | 0.917 |
| Rexene 2040 | Rexene | 12.0 | 0.917 |
| Rexene 2049 | Rexene | 20.0 | 0.917 |
| NA-334 | Equistar | 6.0 | 0.918 |

TABLE III-continued

Commercial Polyethylenes

| Commercial Designation | Company | Melt Index (g/10 mins) | Density (g/cm³) |
|---|---|---|---|
| NA-217 | Equistar | 5.5 | 0.923 |
| NA 285-003 | Equistar | 6.2 | 0.930 |
| Exact 3027 | Exxon | 3.5 | 0.900 |
| Exact 3022 | Exxon | 9.0 | 0.905 |
| Exact 3139 | Exxon | 7.5 | 0.900 |
| SLP 9053 | Exxon | 7.5 | 0.900 |
| Affinity PF1140 | Dow Chemical | 1.6 | 0.895 |

The skin layer may also contain other additives such as the antiblock agents described above for the base layer. The amount of the antiblock agent or agents in the first skin layer may range from about 500 to about 5000 ppm with amounts of about 1000 ppm generally being preferred.

Various nucleating agents and pigments can be incorporated into the film formulations of the present invention. Preferably the nucleating agents are incorporated into the base layer and/or the tie layer, but not in the first skin layer. The amount of nucleating agent added should be an amount sufficient to provide the desired modification of the crystal structure while not having an adverse effect on the desired properties of the facestock. It is generally desired to utilize a nucleating agent to modify the crystal structure and provide a large number of considerably smaller crystals or spherulites to improve the transparency (clarity), and stiffness, and the die-cuttability of the film. Obviously, the amount of nucleating agent added to the film formulation should not have a deleterious affect on the clarity of the film. Nucleating agents that have been used heretofore for polymer films include mineral nucleating agents and organic nucleating agents. Examples of mineral nucleating agents include carbon black, silica, kaolin and talc. Among the organic nucleating agents that have been suggested as useful in polyolefin films include salts of aliphatic mono-basic or di-basic acids or arylalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium beta-naphtholate, lithium benzoate and aluminum tertiary-butyl benzoate also are useful organic nucleating agents. Substituted sorbitol derivatives such as bis (benzylidene) and bis (alkylbenzilidine) sorbitols wherein the alkyl groups contain from about 2 to about 18 carbon atoms are useful nucleating agents. More particularly, sorbitol derivatives such as 1,3, 2,4-dibenzylidene sorbitol, 1,3,2,4-di-para-methylbenzylidene sorbitol, and 1,3,2,4-di-para-methylbenzylidene sorbitol are effective nucleating agents for polypropylenes. Useful nucleating agents are commercially available from a number of sources. Millad 8C-41-10, Millad 3988 and Millad 3905 are sorbitol nucleating agents available from Milliken Chemical Co.

The amounts of nucleating agent incorporated into the film formulations of the present invention are generally quite small and range from about 100 to about 2000 or 4000 ppm of the total facestock. Preferably the amount of nucleating agent should not exceed about 2000 ppm, and in one embodiment, a concentration of about 300 to 500 ppm appears optimum.

Figure 3:
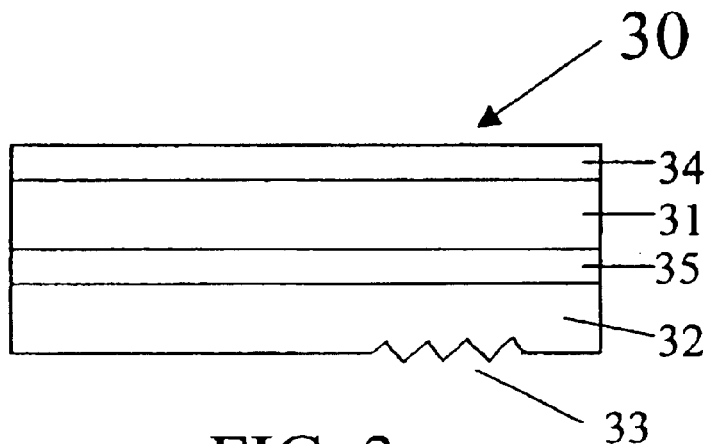
FIG. 3 is a cross-section of a facestock of the present invention comprising a multilayer film having three layers and a holographic layer.

In one embodiment, the facestock film comprises a base layer having a skin layers on each of its surfaces. As shown in FIG. 3, facestock 30 includes base layer 31 having an upper and lower surface. The upper surface of the base layer 31 is adhered to a first skin layer 34 and the lower surface is adhered to a second skin layer 35. Holographic layer 32 having image 33 is adhered to the lower surface of second skin layer 35. A reflective material (not shown) may be coated onto a portion of or the entire lower surface of the holographic layer 32 with image 33.

The composition of the second skin layer 35 may be the same as the first skin layer 34 or different from the composition of the first skin layer. In one embodiment, the second skin layer may consists essentially of the same polymers or blends as present in the first skin layer, or the second skin layer may comprise a different polymers or blends. A particularly useful multilayer film is the coextruded product of a polypropylene skin layer, a blend of polypropylene and ethylene vinyl acetate (18% vinyl acetate) (weight ratio of 75:25) and a base layer or propylene butene copolymer (3.2% butene), titanium dioxide, and calcium carbonate (weight ratio of 50:30:20).

The multilayer film of the invention comprises, in one embodiment, a base layer having an upper surface and a lower surface, and at least a first skin layer bonded to the upper surface of the base layer by a tie layer wherein the base layer comprises (a) a propylene homopolymer or copolymer, (b) a polyethylene, or (c) a blend of a propylene homopolymer and at least one propylene copolymer. The first skin layer comprises (a) a propylene homopolymer or copolymer, (b) a polyethylene, or (c) a blend of a propylene homopolymer and at least one propylene copolymer The layers of the multilayered film of the facestock can be formed by a variety of techniques known to those skilled in the art including blown or cast extrusion, or extrusion coating or by a combination of these techniques. U.S. Pat. No. 5,186,782 (Freedman), and U.S. Pat. Nos. 5,242,650 (Rackovan et al) and 5,435,963 (Rackovan et al) disclose useful procedures for preparing multilayer films, and these patents are hereby incorporated in their entirety by reference herein. The layers can be formed by simultaneous extrusion from a suitable known type of coextrusion die, and the three layers are adhered to each other in a permanently combined state to provide a unitary coextrudate. Alternatively, the base layer can be formed by extrusion of the base layer on a substrate followed by coextrusion coating of the tie layer and first skin layer onto the base layer thereby forming a three layer structure wherein the layers are adhered to each other in a permanently combined state. In another alternative embodiment, the three layers may be separately formed by extrusion and thereafter laminated together by the application of heat and pressure.

Generally, the base layer is relatively thick compared to the first skin layer and the tie layer. In another, although generally not preferred embodiment, the first skin layer may be relatively thick compared to the base layer and the tie layer. Accordingly, thickness ratios for the three layered films may range from about 90:5:5 to 5:5:90 (base:tie:first skin). However, generally preferred thickness ratios for the three layered films (base: tie: first skin) include 90:5:5; 80:10:10; 70:15:15; 85:5:10; and 80:5:15.

The desirable properties of the multilayer film facestocks of the present invention are improved, particularly with regard to machine direction Gurley stiffness and die-cuttability, when at least the base layer, and more preferably, the entire multilayered film of the facestock, has been oriented in the machine direction only. Generally, the base layer and/or entire multilayer film will be oriented in the machine direction at a stretch ratio of at least about 2:1, and more preferably at a stretch ratio of from about 3:1 to about 9:1. In another preferred embodiment, the film is oriented in a machine direction at a ratio of about 4:1 to about 6:1. The oriented film is then preferably heat set or annealed to provide dimensional stability (i.e., to prevent shrinking, relaxing or any distortion of the film).

In one embodiment, the composition of the second skin layer will be different from the composition of the first skin layer, and, in this embodiment, the second skin layer may comprise a polyethylene that is different from the polyethylene used in the first skin layer (including low and medium density polyethylenes) or a thermoplastic film forming polymer that is not a polyethylene having a density of about 0.940 g/cm$^3$ or less. Examples of thermoplastic film forming polymers that can be utilized in the second skin layer, either alone or in combination include polyolefins (linear or branched), polyamides, polystyrenes, nylon, polyesters, polyester copolymers, polyurethanes, polysulfones, polyvinylidine chloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polycarbonates, polyacrylonitriles, and ethylene-vinyl acetate copolymers. Specific examples of thermoplastics useful as the second skin layer include acrylates such as ethylene methacrylic acid, ethylene methyl acrylate, ethylene acrylic acid and ethylene ethyl acrylate.

In one embodiment, the second skin layer comprises a mixture of a polyethylene and a propylene homopolymer or copolymer. The selection of a particular polymer for the second skin layer is dependent on the properties and characteristics that are to be added by the presence of the second skin layer. The polymer for the second skin layer should be compatible with the polymer of the base layer to provide sufficient adhesion to the base layer in the absence of a tie layer. For example, if the base layer contains a propylene polymer, a second skin layer comprising at least some propylene polymer will adhere to the base layer without an intermediate tie layer. It also has been discovered that the use of a composition in the second skin layer that is different from the composition of the first skin layer reduces the blocking tendency when the facestock is rolled on itself.

In one embodiment, the second skin layer comprise a polymer that is softer than the propylene polymer or copolymer, or blends of propylene polymers and copolymers used in the base layer, particularly when the second skin layer is joined with an adhesive to a release coated liner. In particular, it is preferred that the material of the second skin layer has a lower tensile modulus than the tensile modulus of the material comprising the base layer. The use of a lower tensile modulus second skin layer results in a facestock exhibiting improved die-cuttability when compared to a facestock wherein the material of the second skin layer has a higher tensile modulus than the material of the base layer.

In one embodiment, the conformable facestock comprises a polymeric film having an upper surface and a lower surface, a holographic layer on the upper surface of the polymeric film and a protective layer on the upper surface of the holographic layer. The polymeric film may be a monolayer or a multilayer film. The protective layer may be a film of the same polymeric compositions described herein in relation to the polymeric film. The protective film may be laminated to the holographic layer with adhesive or may be heat sealed onto the holographic layer. Alternatively, the protective layer may comprise a cured resin coating applied to the holographic layer. The protective layer may provide anti-static properties, abrasion-resistance, UV-blocking properties, etc. to the facestock. The protective layer is transparent and conformable.

Labelstock

Figure 4:
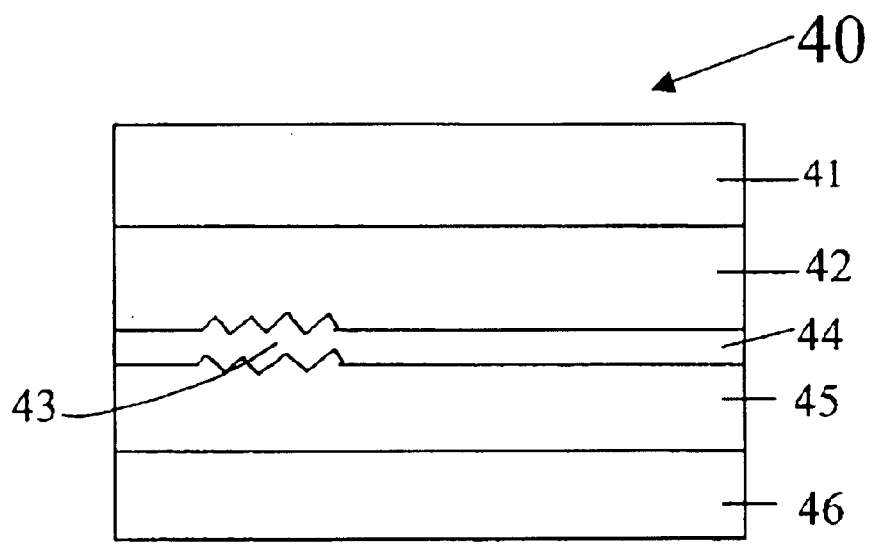
FIG. 4 is a cross-section of a labelstock in accordance with the present invention comprising the facestock illustrated in FIG. 1b with an adhesive layer and a release liner.

The above-described facestocks containing the hologram are useful as labels. As illustrated in FIG. 4, label 40 is made up of polymeric film 41 having an upper surface and a lower surface, and holographic layer 42 having image 43 adhered to the lower surface of polymeric film 41. Optional reflective material 44 is coated over the lower surface of the holographic layer 42. Holographic layer 42 (optionally with the reflective material) is adhered to adhesive 45, which in turn is releasably adhered to release liner 46.

Figure 5:
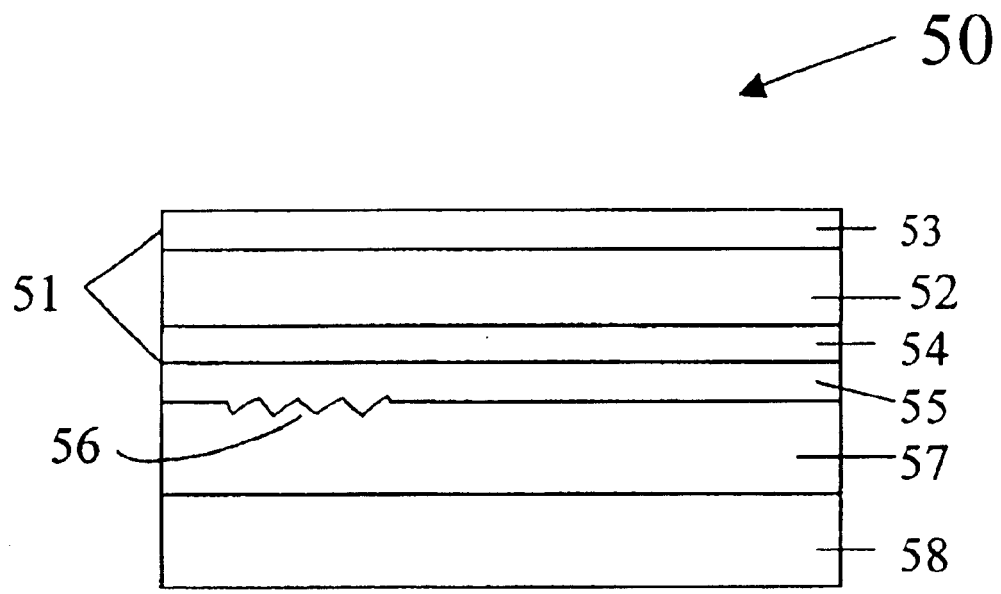
FIG. 5 is a cross-section of a labelstock in accordance with the present invention comprising the facestock illustrated in FIG. 3 with an adhesive layer and a release liner.

FIG. 5 illustrates yet another embodiment of the present invention that relates to a multilayer labelstock for use in preparing adhesive labels. The labelstock 50 comprises a multilayer film polymeric film 51 having skin layers 53 and 54 adhered to the surfaces of base layer 52. The second skin layer 54 is also adhered to holographic layer 55 having image 56. Holographic layer 55 is adhered to adhesive 57, which in turn is releasably adhered to release liner 58. The multilayer film facestock 51 of FIG. 5 is similar to the multilayer facestock of FIG. 3. The present invention also contemplates adhesive multilayer labelstocks that comprise multilayer film facestocks having one, two, three or even four layers and an adhesive layer. Such labelstocks can be illustrated by adding an adhesive layer to the facestocks illustrated in FIGS. 1–3 where the adhesive layer is in contact with the exposed surface of the holographic layers 12, 22, and 32 in FIGS. 1, 2 and 3, respectively.

Figure 6:
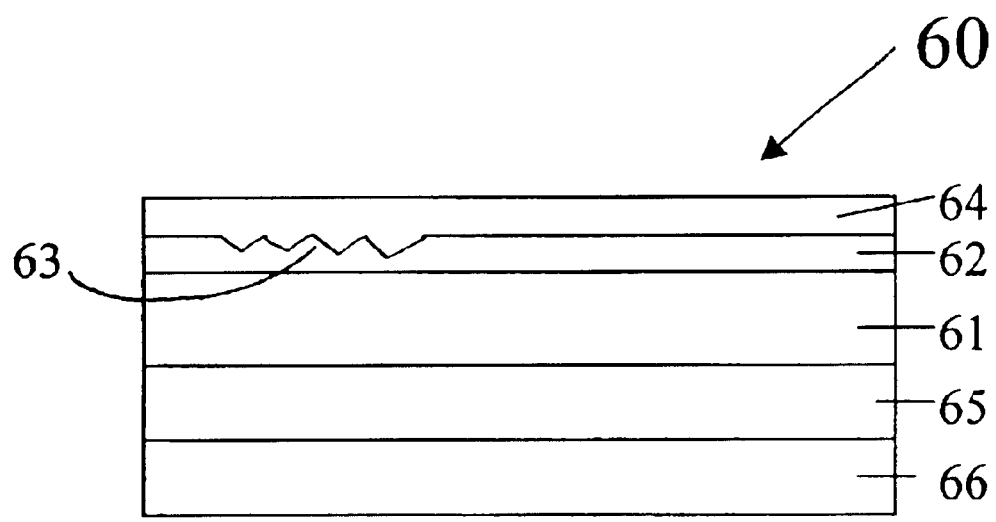
FIG. 6 is a cross-section of a labelstock in accordance with the present invention in which a protective layer overlies the holographic layer.

In another embodiment illustrated in FIG. 6, the labelstock 60 comprises a polymeric film 61 having an upper surface and a lower surface, holographic layer 62 with image 63 adhered to the upper surface of polymeric film 61, and protective layer 64 adhered to the upper surface of holographic layer 62. An adhesive layer 65 is adhered to the lower surface of polymeric film 61 and releasably adhered to release liner 66. Polymeric film 61 may be a monolayer or a multilayer film.

The labelstock of the present invention generally has an overall thickness of up to about 20 mils. In one embodiment, the thickness of the labelstock is from about 0.6 mils to about 12 mils.

Typically, the adhesive layer has a thickness in the range of from about 0.1 to about 2 mils (2.5 to 50 microns). Adhesives suitable for use in labelstocks of the present invention are commonly available in the art. Generally, these adhesives include pressure-sensitive adhesives, heat-activated adhesives, hot melt adhesives, and the like. Pressure-sensitive adhesives are particularly preferred. These include acrylic based adhesives as well as other elastomers such as natural rubber or synthetic rubbers containing polymers or copolymers of styrene, butadiene, acrylonitrile, isoprene and isobutylene. Pressure-sensitive adhesives are well known in the art and any of the known adhesives can be used with the facestocks of the present invention. In one preferred embodiment, the pressure-sensitive adhesives are based on copolymers of acrylic acid esters, such as, for example, 2-ethyl hexyl acrylate, with polar comonomers such as acrylic acid.

Adhesives that are tacky at any temperature up to about 160° C. (about 320° F.) are particularly useful. PSAs that are tacky at ambient temperatures are particularly useful in the coextruded adhesive constructions of the present invention. A variety of conventional PSAs can be utilized provided that the viscosity is or can be modified to be similar to the viscosity of the polymeric film material that is being coextruded with the adhesive. Useful PSA compositions are fluid or pumpable at the temperatures used in the melt processing. Also, the adhesive compositions should not significantly degrade or gel at the temperature employed and over the time required for melt processing and extrusion. Typically, the adhesive compositions have a viscosity of from 1000 poise to 1,000,000 poise at the processing temperature.

The adhesives may generally be classified into the following categories:

Random copolymer adhesives such as those based upon acrylate and/or methacrylate copolymers, α-olefin copolymers, silicone copolymers, chloroprene/acrylonitrile copolymers, and the like, Block copolymer adhesives including those based upon linear block copolymers (i.e., A-B and A-B-A type), branched block copolymers, star block copolymers, grafted or radial block copolymers, and the like, and Natural and synthetic rubber adhesives.

A description of useful pressure-sensitive adhesives may be found in *Encyclopedia of Polymer Science and Engineering*, Vol.13. Wiley-Interscience Publishers (New York, 1988). Additional description of useful pressure-sensitive adhesives may be found in *Encyclopedia of Polymer Science and Technology*, Vol. 1, Interscience Publishers (New York, 1964).

Commercially available pressure-sensitive adhesives are useful in the invention. Examples of these adhesives include the hot melt pressure-sensitive adhesives available from H. B. Fuller Company, St. Paul, Minn. as HM-1 597, HL-2207-X, HL-2115X, HL-2193-X. Other useful commercially available pressure-sensitive adhesives include those available from Century Adhesives Corporation, Columbus, Ohio.

Conventional PSAs, including silicone-based PSAs, rubber-based PSAs, and acrylic-based PSAs are useful. Another commercial example of a hot melt adhesive is H2187-01, sold by Ato Findley, Inc., of Wauwatusa, Wis. In addition, rubber based block copolymer PSAs described in U.S. Pat. No. 3,239,478 (Harlan) also can be utilized in the coextruded adhesive constructions of the present invention, and this patent is hereby incorporated by a reference for its disclosure of such hot melt adhesives.

In one preferred embodiment, the pressure sensitive adhesive utilized in the present invention comprise rubber based elastomer materials such as linear, branched, grafted, or radial block copolymers represented by the diblock structures A-B, the triblock A-B-A, the radial or coupled structures $(A-B)_n$, and combinations of these where A represents a hard thermoplastic phase or block that is non-rubbery or glassy or crystalline at room temperature but fluid at higher temperatures, and B represents a soft block that is rubbery or elastomeric at service or room temperature. These thermoplastic elastomers may comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons that may be monocyclic or bicyclic in nature. The preferred rubbery blocks or segments are polymer blocks of homopolymers or copolymers of aliphatic conjugated dienes. Rubbery materials such as polyisoprene, polybutadiene, and styrene butadiene rubbers may be used to form the rubbery block or segment. Particularly preferred rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes that may be utilized include any of those that exhibit elastomeric properties. The block copolymers may be diblock, triblock, multiblock, starblock, polyblock or graftblock copolymers. Throughout this specification and claims, the terms diblock, triblock, multiblock, polyblock, and graft or grafted-block with respect to the structural features of block copolymers are to be given their normal meaning as defined in the literature such as in the *Encyclopedia of Polymer Science and Engineering*, Vol. 2, (1985) John Wiley & Sons, Inc., New York, pp. 325–326, and by J. E. McGrath in *Block Copolymers, Science Technology*, Dale J. Meier, Ed., Harwood Academic Publishers, 1979, at pages 1–5.

Such block copolymers may contain various ratios of conjugated dienes to vinyl aromatic hydrocarbons including those containing up to about 40% by weight of vinyl aromatic hydrocarbon. Accordingly, multi-block copolymers may be utilized that are linear or radial symmetric or asymmetric and that have structures represented by the formulae A-B, A-B-A, A-B-A-B, B-A-B, $(AB)_{0,1,2}$... BA, etc., wherein A is a polymer block of a vinyl aromatic hydrocarbon or a conjugated diene/vinyl aromatic hydrocarbon tapered copolymer block, and B is a rubbery polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes that may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

Examples of vinyl aromatic hydrocarbons that may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc. The preferred vinyl aromatic hydrocarbon is styrene.

Many of the above-described copolymers of conjugated dienes and vinyl aromatic compounds are commercially available. The number average molecular weight of the block copolymers, prior to hydrogenation, is from about 20,000 to about 500,000, preferably from about 40,000 to about 300,000.

The average molecular weights of the individual blocks within the copolymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the conjugated diene portion generally is from about 10% to about 80%, and the vinyl content is preferably from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene-butadiene (SB), styrene-isoprene (SI), and the hydrogenated derivatives thereof. Examples of triblock polymers include styrene-butadiene-styrene (SBS), styrene-isoprene-styrene (SIS), alpha-methylstyrene-butadiene-alpha-methylstyrene, and alpha-methylstyrene-isoprene alpha-methylstyrene. Examples of commercially available block copolymers useful as the adhesives in the present invention include those available from Shell Chemical Company and listed in the following Table III.

TABLE III

| Kraton | Type | Styrene/Rubber Ratio (w) | Melt Index |
|---|---|---|---|
| D1101 | Linear SBS | 31/69 | <1 |
| D1107P | Linear SIS | 15/85 | 11 |
| D1111 | Linear SIS | 22/78 | 3 |
| D1112P | Linear SIS | 15/85 | 23 |
| D1113P | Linear SIS | 16/84 | 24 |
| D1117P | Linear SIS | 17/83 | 33 |
| D1320X | Multi-arm (SI)$_n$ | 10/90 | NA |

Vector 4111 is a SIS block copolymer available from Dexco of Houston, Tex.

Upon hydrogenation of the SBS copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes that can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers that are carried out in a manner and to extent as to produce selectively hydrogenated copolymers having a residual unsaturation content in the polydiene block of from about 0.5% to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are hydrogenated products of the block copolymers of styrene-isoprene-styrene such as a styrene-(ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP).

A number of selectively hydrogenated block copolymers are available commercially from Shell Chemical Company under the general trade designation "Kraton G." One example is Kraton G1652 which is a hydrogenated SBS triblock comprising about 30% by weight of styrene end blocks and a midblock that is a copolymer of ethylene and 1-butene (EB). A lower molecular weight version of G1652 is available from Shell under the designation Kraton G1650. Kraton G1651 is another SEBS block copolymer that contains about 33% by weight of styrene. Kraton G1657 is an SEBS diblock copolymer that contains about 13%w styrene. This styrene content is lower than the styrene content in Kraton G1650 and Kraton G1652.

In another embodiment, the selectively hydrogenated block copolymer is of the formula $$B_n(AB)_o A_p$$

wherein n=0 or 1;

o is 1 to 100;

p is 0 or 1;

each B prior to hydrogenation is predominantly a polymerized conjugated diene hydrocarbon block having a number average molecular weight of about 20,000 to about 450,000;

each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation.

In other embodiments, the unsaturation of block B is reduced upon hydrogenation to less than 5% of its original value, and the average unsaturation of the hydrogenated block copolymer is reduced to less than 20% of its original value.

The block copolymers may also include functionalized polymers such as may be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The reaction between the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons that have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. Nos. 4,795,782 describes and gives examples of the preparation of the grafted block copolymers by the solution process and the melt process. U.S. Pat. Nos. 4,578,429 contains an example of grafting of Kraton G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated copolymers of styrene and butadiene include Kraton FG1901X, FG1921X, and FG1924X from Shell, often referred to as maleated selectively hydrogenated SEBS copolymers. FG1901X contains about 1.7% by weight bound functionality as succinic anhydride and about 28% w of styrene. FG1921X contains about 1% w of bound functionality as succinic anhydride and 29% w of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac 3530 is available from Nippon Zeon and is believed to be a linear styrene-isoprene-styrene block copolymer.

The polymer film materials and adhesive compositions used to form the constructions of the present invention may be neat, or they may be emulsions or solvent-based. Emulsion and solvent-based acrylic based PSAs are known and described in, for example, U.S. Pat. Nos. 5,639,811 and 5,164,444, respectively, and these patents are hereby incorporated by reference for such disclosures.

The present labelstock has sufficient stiffness for good dispensing and matrix stripping. Orientation of the multilayer film facestocks in the machine direction increases the tensile modulus in the machine direction which contributes to dimensional stability and good print registration. The multilayer film facestocks of the present invention can be oriented in the machine direction by procedures well known to those skilled in the art such as by hot stretching the multilayer film facestock at a stretch ratio of at least 2, and generally at a stretch ratio from about 2 to about 9. After passing around preheated rolls that soften the facestock, the softened facestock is then stretched and thereafter annealed or heat-set, and finally, cooled over a chill roll to complete the hot stretch operation. The facestock may then be taken up in roll form and stored.

In the manufacture of labelstock from the above-described multilayer film facestocks in accordance with the invention, liner or carrier stock may be provided. The liner or carrier stock may comprise a multilayer liner made for example as disclosed in U.S. Pat. No. 4,713,273, the entire disclosure of which is incorporated herein by reference, or may be a conventional liner or carrier consisting of a single paper of film layer that may be supplied in roll form. If it has not been previously provided with a release coating and does not itself include components to inherently generate a release surface at its adhesive-contacting face, the liner or carrier may be coated with a release coating (e.g., a silicone). If a release coating is applied, it is dried or cured following application by any suitable means.

The release face of the release liner or carrier may be coated with a layer of pressure-sensitive adhesive for subsequent transfer of the adhesive to the facestock with which the liner or carrier is employed. When the facestock is combined with the liner or carrier, the adhesive is joined to the facestock. Later, the liner or carrier is removed to expose the adhesive, and the adhesive remains permanently joined to the facestock.

In some applications, the adhesive layer may be a heat-activated adhesive or a hot-melt adhesive such as used in in-mold label applications, as distinguished from a pressure-sensitive adhesive. If the adhesive is a heat-activated adhesive or a hot-melt adhesive, there may be no need for the provision of a release liner for inherent releasability such as is required when using a pressure-sensitive adhesive.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A conformable labelstock for use in adhesive labels comprising: a conformable facestock comprising a polymeric film having an upper surface and a lower surface and a holographic layer having an upper surface and a lower surface, wherein the upper surface of the holographic layer is adhered to the lower surface of the polymeric film; and an adhesive layer having an upper surface and lower surface, wherein the lower surface of the adhesive layer is adhered to the upper surface of the polymeric film.

2. The conformable labelstock of claim 1 further comprising a protective layer adhered to the lower surface of the holographic layer.

3. The conformable labelstock of claim 1 wherein the adhesive is a pressure sensitive adhesive.

4. The conformable labelstock of claim 1 further comprising a release liner releasably adhered to the upper surface of the adhesive layer.

5. A pressure sensitive adhesive label die-cut from the conformable labelstock of claim 1.

* * * * *